United States Patent [19]

Sato et al.

[11] Patent Number: 4,888,067

[45] Date of Patent: Dec. 19, 1989

[54] PROCESS FOR PRODUCING FLUX FOR BRAZING

[75] Inventors: Shoichi Sato; Yasuhiro Osame; Seiji Tazaki, all of Oyama, Japan

[73] Assignee: Showa Aluminum Corporation, Sakai, Japan

[21] Appl. No.: 203,193

[22] Filed: Jun. 7, 1988

[30] Foreign Application Priority Data

Jun. 10, 1987 [JP] Japan .................. 62-144835

[51] Int. Cl.$^4$ .............................. B23K 35/34
[52] U.S. Cl. ........................ 148/26; 228/223
[58] Field of Search ............ 148/23, 26; 228/207, 228/223

[56] References Cited

U.S. PATENT DOCUMENTS

| | | | |
|---|---|---|---|
| 3,951,328 | 4/1976 | Wallace et al. | 148/26 |
| 4,723,597 | 2/1988 | Sonoda | 148/26 |

FOREIGN PATENT DOCUMENTS

| | | |
|---|---|---|
| 197396 | 11/1984 | Japan . |
| 99477 | 6/1985 | Japan . |
| 169582 | 9/1985 | Japan . |
| 1055914 | 1/1967 | United Kingdom . |

Primary Examiner—Robert McDowell
Attorney, Agent, or Firm—Armstrong, Nikaido, Marmelstein, Kubovcik & Murray

[57] ABSTRACT

A flux for brazing is prepared from 31.5% to 56.2% of KF and 68.5% to 43.8% of at least one of $\gamma$-AlF$_3$ and finely divided $\beta$-AlF$_3$. The KF is dissolved in water, and the AlF$_3$ is then placed into the resulting KF aqueous solution to react the KF with the AlF$_3$. The reaction product is dried.

3 Claims, No Drawings

PROCESS FOR PRODUCING FLUX FOR BRAZING

BACKGROUND OF THE INVENTION

The present invention relates to a process for producing a flux for brazing, and more particularly to a process for producing a flux for brazing for use in fabricating automotive condensers, radiators, evaporators, heaters and other aluminum heat exchangers.

The percentages as used herein and in the appended claims are by weight, and the term "aluminum" is used herein as including alloys thereof.

In brazing aluminum materials, fluxes are used for removing oxide coatings from the surfaces to be joined together. While chloride fluxes have heretofore been used for this purpose, they leave residues which cause corrosion to aluminum after brazing and which must therefore be removed by washing. Nevertheless, depending on the construction of the brazed article, such residues are not always removable completely.

To overcome the above problem, U.S. Pat. No. 3,951,328 proposes a flux in the form of a mixture of potassium fluoaluminate complexes essentially free of unreacted KF and having a composition corresponding to an $AlF_3/KF$ ratio between about 65:35 and about 45:55. The "potassium fluoaluminate complexes" refers to complexes of the type formed by fusion of $AlF_3$ and KF, such complexes having the formulas $K_3AlF_6$ and $KAlF_4$. The complexes are formed by the fusion of $AlF_3$ and KF to render the flux free from unreacted KF. When containing unreacted KF, the flux is hydroscopic and is unsuitable for use in the form of an aqueous slurry, since slurrying of the flux in water would result in solution of KF and consequent possibility of disproportionation of the flux on drying and melting point variability.

However, resorting to the step of fusing KF and $AlF_3$ in forming the complexes entails an increase in the production cost of the flux and is unfavorable in view of production efficiency.

SUMMARY OF THE INVENTION

The present invention has overcome the foregoing problems and provides a process for producing a flux for brazing which comprises preparing 31.5% to 56.2% of KF and 68.5% to 43.8% of at least one of Y-$AlF_3$ and β-$AlF_3$, reacting the KF with the $AlF_3$ in water, and drying the reaction product. A flux free from unreacted KF can be obtained efficiently by this process without resorting to any fusion step.

The $AlF_3$ to be used in the process of the invention must be Y-$AlF_3$, β-$AlF_3$ or a mixture of Y-$AlF_3$ and β-$AlF_3$. α-$AlF_3$, if reacted with KF, fails to undergo an exothermic reaction, permitting the resulting flux to contain unreacted KF.

The amounts of the reactants should be 31.5% to 56.2% of KF, and 68.5% to 43.8% of at least one of Y-$AlF_3$ and β-$AlF_3$ because if the amounts are outside these ranges, the liquidus temperature exceeds 600° C., with the likelihood that the flux will not melt fully during brazing, possibly failing to effect satisfactory brazing. Solders generally used for brazing aluminum are about 600° C. in melting point. In the above ranges, it is more preferably to use 38.9% to 46.8% of KF, and 61.1% to 53.2% of at least one of Y-$AlF_3$ and β-$AlF_3$. Most preferably, about 45.8% of KF, and about 54.2% of at least one of Y-$AlF_3$ and β-$AlF_3$ are used.

Finely divided KF and at least one of finely divided Y-$AlF_3$ and finely divided β-$AlF_3$ are prepared. First, the KF is dissolved in water to obtain a KF aqueous solution. Since KF has a high solubility in water (about 97%), the KF to be dissolved can be in the form of a block instead of the finely divided KF.

The finely divided $AlF_3$ is then placed into the KF aqueous solution, preferably in small portions while stirring the solution so as to uniformly disperse the finely divided $AlF_3$. The finely divided $AlF_3$ to be used is about 150 mesh (about 100 μm) in means particle size as is usually the case with commercial products for industrial use, although this particle size is not limitative. After the $AlF_3$ has been placed into the KF aqueous solution, the mixture is further continuously stirred for 10 to 20 minutes when required. The stirring is discontinued upon the KF and $AlF_3$ starting to undergo an exothermic reaction. When it takes an excessively long period of time to initiate the exothermic reaction, it is recommended to preheat the KF aqueous solution to about 50° C. Both KF and $AlF_3$ may be placed into water and then stirred.

The exothermic reaction proceeds at 120° to 130° C. With the progress of the exothermic reaction, the water evaporates off almost completely. The reaction product is dried in the atmosphere at a temperature of 100° to 550° C. to give a flux.

When the flux obtained is to be used for brazing, it is desirable to suspend the flux in water or like liquid and uniformly apply the suspension to the two pieces of aluminum material to be joined together with a brazing solder interposed therebetween. The flux may be applied by any method such as immersion, spraying or brush coating, but immersion is most desirable. The solder is melted for brazing by heating the assembly in a nonoxidizing atmosphere such as an inert gas atmosphere at a temperature lower than the melting point of the aluminum material but higher than the melting point of the flux.

DESCRIPTION OF THE PREFERRED EMBODIMENTS

Example 1

Finely divided KF (5.5 kg) having a purity of 99.8% and 6.5 kg of finely divided Y-$AlF_3$ having a purity of at least 90% for industrial use were prepared. First, 6 liters of water was added to the KF to obtain a KF aqueous solution.

The Y-$AlF_3$ was then placed in small portions in the KF aqueous solution while stirring the solution. When the stirring was continued for 10 minutes further after the whole amount of Y-$AlF_3$ was placed in, an exothermic reaction started, whereupon the stirring was discontinued. The water evaporated off almost completely with the progress of the exothermic reaction.

The reaction product was dried in the atmosphere at 200° C. for 300 minutes, giving a flux. When the composition of the flux was analyzed, the flux was found to contain Y-$AlF_3$, $K_3AlF_6$ and a small amount of $K_2AlF_5$ but no KF.

Example 2

Finely divided KF (5.0 kg) having a purity of at least 97% for industrial use and 7.0 kg of finely divided Y-$AlF_3$ having a purity of at least 90% for industrial use were prepared. First, 6 liters of water was added to the KF to obtain a KF aqueous solution.

The Y-AlF$_3$ was then placed in small portions into the KF aqueous solution while stirring the solution. When the stirring was continued for 10 minutes further after the whole amount of Y-AlF$_3$ was placed in, an exothermic reaction started, whereupon the stirring was discontinued. The water evaporated off almost completely with the progress of the exothermic reaction.

The reaction product was dried in the atmosphere at 200° C. for 300 minutes, giving a flux. When analyzed, the flux was found to contain Y-AlF$_3$, KAlF$_4$, K$_3$AlF$_6$ and K$_2$AlF$_5$·H$_2$O but no KF.

Example 3

A flux was prepared in the same manner as in Example 2 with the exception of using β-AlF$_3$ having a purity of at least 90.0% for industrial use in place of the Y-AlF$_3$. When analyzed, the flux was found to contain β-AlF$_3$, KAlF$_4$, K$_3$AlF$_6$ and a small amount of K$_2$AlF$_5$·H$_2$O but no KF.

Example 4

A flux was obtained in the same manner as in Example 2 with the exception of preparing 50.0 kg of finely divided KF having a purity of 99.3%, and 30.0 kg of Y-AlF$_3$ and 4.0 kg of β-AlF$_3$ both finely divided and having a purity of at least 90.0% for industrial use. When analyzed, the flux was found to contain Y-AlF$_3$, β-AlF$_3$, KAlF$_4$, K$_3$AlF$_6$ and a small amount of K$_2$AlF$_5$·H$_2$O but no KF.

Comparative Example

Finely divided KF (5.5 kg) having a purity of at least 97.0% for industrial use and 6.3 kg of finely divided α-AlF$_3$ having a purity of at least 90.0% for industrial use were prepared. First, 6 liters of water was added to the KF to obtain a KF aqueous solution. The α-AlF$_3$ was then placed in small portions into the KF aqueous solution while stirring the solution. Although the mixture was continuously stirred after the whole amount of α-AlF$_3$ was placed in, no exothermic reaction occurred.

The reaction product was dried in the atmosphere at 200° C. for 300 minutes to give a flux. When analyzed, the flux was found to contain α-AlF$_3$, K$_3$AlF$_6$ and further large quantities of unreacted KF and KF·2H$_2$O.

The fluxes obtained in Examples 1 to 4 were tested for brazing properties by the following method, using aluminum panels of A1050, and brazing sheets each comprising a base of A3003 and a brazing solder of A4045 cladding one surface of the base. Water was added to each of the fluxes of Examples 1 to 4 to prepare a suspension having a concentration of 8%. The aluminum panel and the brazing sheet to be joined together were immersed in the suspension, then withdrawn and dried.

The panel and sheet were then fitted together and heated at 610° C. for 5 minutes for brazing in an oven adjusted to a dew point of −40° C. with N$_2$ gas.

Each of the brazed assemblies thus obtained was then checked for the brazed state to find that the fillet formed was satisfactory to give an excellent brazed joint.

What is claimed is:

1. A process for producing a flux for brazing comprising preparing 31.5% to 56.2% of KF and 68.5% to 43.8% of at least one of Y-AlF$_3$ and β-AlF$_3$, dissolving the KF in water to form a soluton, reacting the KF solution with the AlF$_3$ by adding the AlF$_3$ with stirring to the solution, continuously stirring the solution for 10 to 20 minutes and drying the reaction product at 100° to 550° C.

2. A process as defined in claim 1 wherein the AlF$_3$ is in a finely divided form and has a mean particle size of about 100 μm.

3. A process as defined in claim 1 further comprising preheating the KF aqueous solution to about 50° C. before placing the AlF$_3$ thereinto.

* * * * *